May 16, 1950 F. D. FOLEY 2,507,774
ANTISKID MECHANISM FOR AUTOMOBILES
Filed Sept. 17, 1948 2 Sheets-Sheet 2

Francis D. Foley, Inventor
By L. B. James
Attorney

Patented May 16, 1950

2,507,774

UNITED STATES PATENT OFFICE 2,507,774

ANTISKID MECHANISM FOR AUTOMOBILES

Francis D. Foley, Manchester, Mass.

Application September 17, 1948, Serial No. 49,685

3 Claims. (Cl. 188—5)

This invention relates to anti-skid devices and more particularly to power operated anti-skid mechanisms for motor vehicles.

One of the objects of this invention resides in a power operated anti-skid mechanism adapted to resist side slippage of the rear wheels of trailer-trucks or other motor vehicles without retarding their forward movement.

Another object of this invention resides in a power operated anti-skid mechanism for motor vehicles adapted to retard sidewise slippage of the wheels of vehicles and yet permit unretarded forward or backward movement of the same under its normal power.

A still further object of this invention resides in the provision of a power operated anti-skid mechanism for motor or other types of ground traversing vehicles adapted to be controlled by the vehicle operator.

A still further object of this invention resides in the particular disposition of the anti-skid mechanism relative to the wheels of that vehicle upon which it is assembled.

Aside from the aforesaid objects, this invention resides in the particular construction of the ground engaging shoe.

One of the salient features of this invention resides in so constructing and disposing the ground engaging shoes of the anti-skid mechanism relative to the wheels of a vehicle, that they retard and prevent sidewise slippage of the vehicle over snow, ice and other slippery surfaces and, at the same time, permit forward or rearward sliding movement thereof over the ground without seriously damaging road beds.

With these and others objects in view, this invention resides in certain novel features of construction and arrangement of elements to be hereinafter more particularly set forth in the specification, illustrated in the accompanying drawings and pointed out in the appended claims and, although this disclosure depicts my present conception of the invention, the right is reserved to resort to such departures therefrom as come within the scope of the claims.

In the accompanying drawings forming a part of this application:

Figure 1:
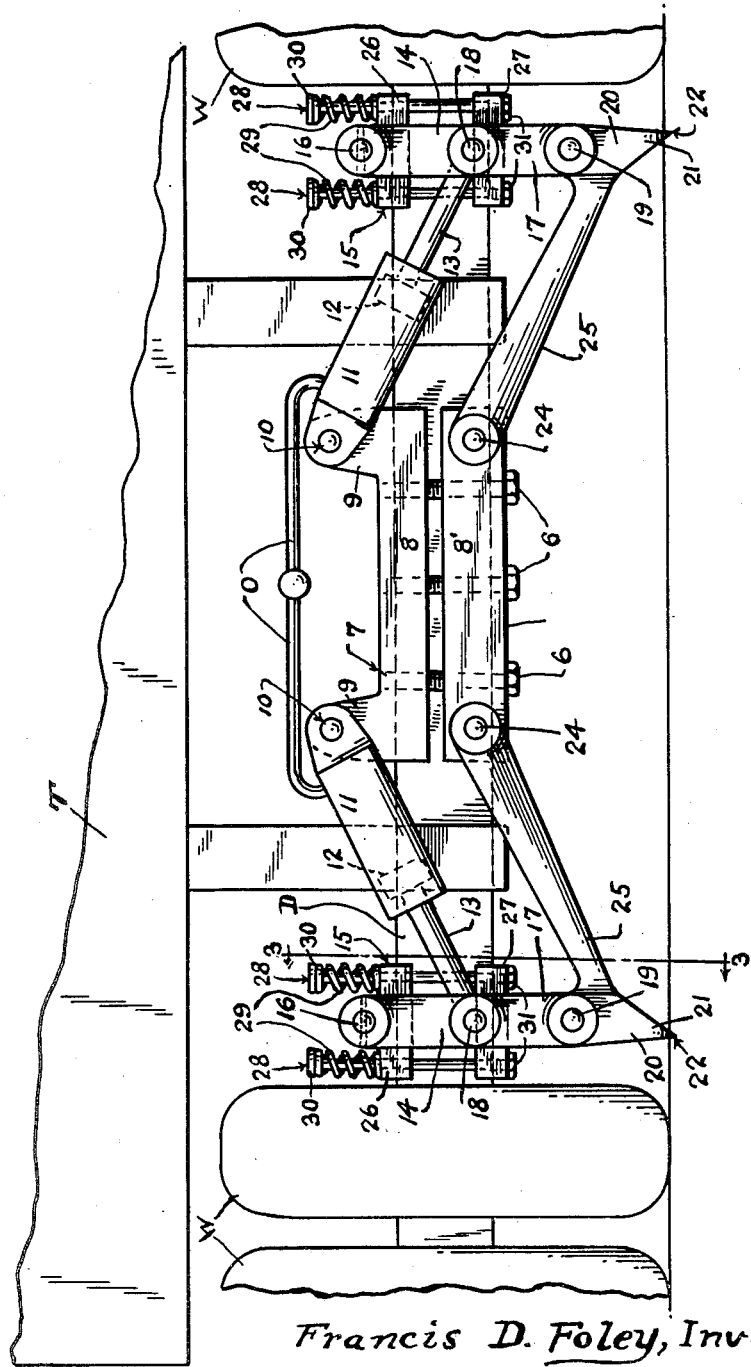
Fig. 1 is an enlarged side view of the rear portion of a motor vehicle showing the ground engaging shoes of the anti-skid mechanism in operative position.
Figure 2:
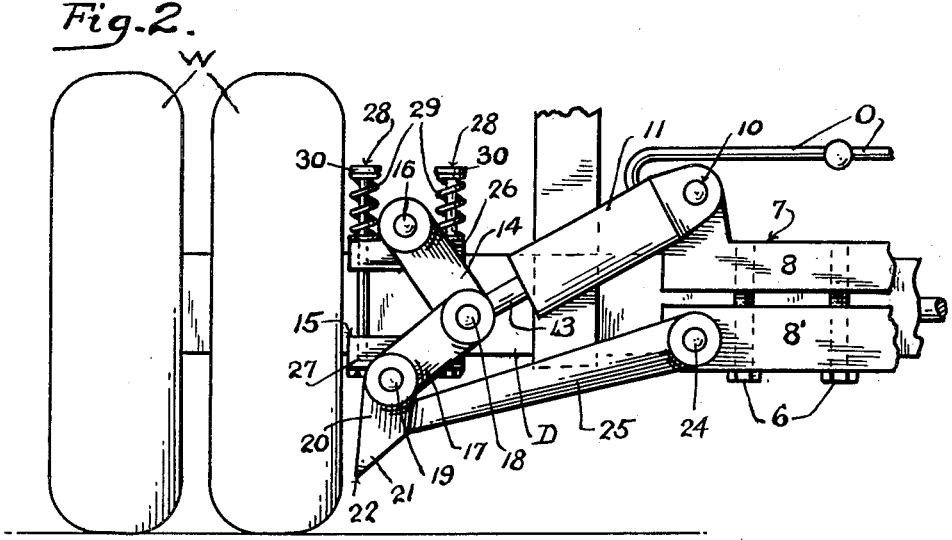
Fig. 2 is a similar view showing the ground engaging shoes of the anti-skid mechanism in inoperative position.
Figure 3:
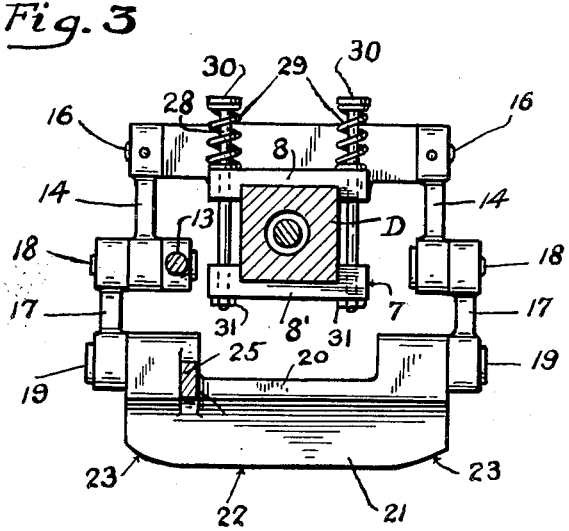
Fig. 3 is a rear view of the motor vehicle showing the ground engaging shoes of the anti-skid mechanism in inoperative position.

In the present illustration of this invention the numeral 5 designates, in general, a trailer-truck which, among other wellknown elements, consists of a cab B having a trailer T attached thereto in the usual manner and supported by wheels W mounted on a rear axle D herein shown as being of rectangular configuration but may be of any approved construction on which the elements of this invention may be secured so as to efficiently function.

Rigidly secured to the axle D, preferably at its medial portion, by cap-screws 6 or the like, is a center clamp 7 consisting of an upper member 8 and a lower member 8'. Said upper member is provided with laterally spaced and upstanding ears or lugs 9 having apertures 10 therethrough to pivotally support oppositely and outwardly extending cylinders 11 having pistons 12 therein provided with slidable piston rods 13 which are pivotally connected at their outer ends to rocker-arms 14 rockably secured to end clamps 15 yieldingly secured to the axle adjacent the inner sides of the wheels of the trailer. Said rocker-arms depend from short shafts 16 extending through the aforesaid end clamps and are connected at their lower ends to links 17 by pivotal pins 18 extending through the same and outer ends of the piston rods.

Pivotally secured to the lower ends of the aforesaid links 17 through the instrumentality of pins 19 are ground engaging shoes 20 having outwardly and downwardly bevelled lower ends 21 terminating in elongated sharp ground contacting edges 22 which are bevelled at their front and rear ends as indicated by the numeral 23 to permit them to slide over the ground, snow or ice with little or no tendency to gouge the same.

Rigidly formed on the inner sides of the ground engaging shoes with their inner ends pivotally secured to the lower members of the center clamp 7 as by pivotal pins 24, are supporting arms 25 which function to dispose the ground engaging shoes in rigid operative positions inwardly of the wheels of the trailer or other vehicle, and in inoperative positions above the ground when manipulated by the pistons 12 controlled by a manually operated valve V or other similar device of a hydraulic or other wellknown power transmitting system O connected to the cylinders 11.

In order to provide a certain degree of yieldability in the end clamps 15 and, thereby, cushion undue shocks on the ground engaging shoes and elements connected thereto, they are formed of upper and lower members 26 and 27 secured on the axle by elongated bolts 28 surrounded by expansion coil springs 29 having their lower ends bearing on the upper members 26 with their upper ends bearing against the heads 30 of the bolts. The tension of said springs may be regulated by nuts 31 screwed on the bolts.

Although the ground engaging shoes are manipulated by the particular hydraulic system shown, it is within the purview of this invention to manipulate the present anti-skid mechanism with any wellknown fluid, mechanical or manual means just so like functions are attained.

With the aforesaid anti-skid mechanism attached to appropriate parts of a motor vehicle or the like, sidewise slippage of the vehicle is prevented by the vehicle operator by simply opening the valve V to obtain pressure on the fluid in the hydraulic system to manipulate the ground engaging shoes in contact with the ground inwardly of the wheels of the vehicle and in parallelism to a longitudinal line running through the vehicle, in which position the shoes will slide on the ground in that direction the vehicle is travelling with little or no tendency to gouge or damage the road bed.

With this invention fully described it is manifest that means are set forth whereby motor vehicles, especially heavy trailer-trucks and the like, can safely travel over snow, ice and slippery roads with the hazard of sidewise slipping reduced to a minimum and, through the simplicity of the association of elements employed, positive operation is assured.

Having thus described my invention, what I claim and desire to protect by Letters Patent is:

1. The combination with a motor vehicle including an axle having wheels thereon, end clamps yieldingly secured to the axle inwardly of the wheels, depending arms journalled on said end clamps, elongated ground engaging shoes disposed inwardly of the wheels, links pivotally connecting the ground engaging shoes to the lower ends of the depending arms, inwardly extending arms formed on the shoes, a center clamp rigidly secured to the medial portion of the axle, pivotal pins connecting the inner ends of the arms on the shoes to the lower portion of the center clamp, upstanding apertured lugs formed on the upper portion of the center clamp, hydraulic cylinders pivotally secured to the lugs, pistons in the cylinders, piston rods connecting the pistons to those pivots securing the links to the depending arms, and a hydraulic system connected to the cylinders.

2. The combination with a motor vehicle having wheels mounted on an axle thereof, elongated ground engaging shoes having sharp lower edges bevelled upwardly at their forward and rear ends, end clamps yieldingly secured to the axle above the shoes, depending arms journalled on the end clamps, links connecting the arms to the shoes, a center clamp rigidly secured to the axle between the end clamps, arms rigidly formed on the inner sides of the shoes and having their inner ends pivoted to opposite ends of the center clamp adjacent its lower side, cylinders pivoted to opposite ends of the center clamp above the pivotal points of the arms of the shoes, pistons in the cylinders, piston rods connecting the piston to the depending arms, fluid supply means connected to the cylinders, and manual control means connected to the fluid supply means.

3. The combination with a motor vehicle having wheels mounted on an axle thereof, end clamps disposed on the axle inwardly of the wheels, bolts extending through opposite ends of the clamps, expansion coil springs surrounding the outer ends of the bolts, nuts threadedly disposed on the outer ends of the bolts and bearing against the outer ends of said springs, depending arms pivotally secured to the end clamps, elongated ground engaging shoes having their lower inner portions bevelled and their forward and rear ends curved upwardly, links pivotally connected to the aforesaid arms and ground engaging shoes, inwardly extending arms rigidly formed on said ground engaging shoes, a center clamp rigidly secured to the medial portion of the axle, pivotal pins connecting the inner ends of the arms on the ground engaging shoes to the opposite lower ends of the center clamp, upstanding lugs formed on the upper portion of the center clamp, hydraulic cylinders pivotally secured to said lugs, pistons in the cylinders, piston rods connecting the pistons to those pivots securing the links to the depending arms, and a hydraulic system connected to the cylinders.

FRANCIS D. FOLEY.

REFERENCES CITED

The following references are of record in the file of this patent:

UNITED STATES PATENTS

| Number | Name | Date |
| --- | --- | --- |
| 1,540,624 | Haupt | June 2, 1925 |
| 1,924,276 | Gerstenberger | Aug. 29, 1933 |
| 2,020,386 | Ulrich | Nov. 12, 1935 |